United States Patent
Ott et al.

(10) Patent No.: US 6,770,329 B2
(45) Date of Patent: Aug. 3, 2004

(54) LOW-YELLOWING AQUEOUS CLEAR POWDER COATING DISPERSIONS, METHOD OF MAKING THE DISPERSIONS, AND PROCESS FOR PRODUCING CLEARCOAT FINISHES WITH THE DISPERSIONS

(75) Inventors: Günther Ott, Münster (DE); Joachim Woltering, Münster (DE); Wilfried Stübbe, Greven (DE); Ulrike Röckrath, Senden (DE); Maximilian Bendix, Oelde (DE); Ulrich Kalck, Neuhofen (DE); Jan Berg, Münster (DE); Götz-Ekkehard Sapper, Rimpar (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/273,189

(22) Filed: Oct. 17, 2002

(65) Prior Publication Data

US 2003/0059553 A1 Mar. 27, 2003

Related U.S. Application Data

(63) Continuation of application No. 09/959,067, filed as application No. PCT/EP00/032746 on Apr. 12, 2000, now Pat. No. 6,509,096.

(30) Foreign Application Priority Data

May 3, 1999 (DE) ....................... 199 20 1412

(51) Int. Cl.$^7$ ............................. B05D 1/38; B05D 3/02; B05D 3/06; B05D 7/16
(52) U.S. Cl. ....................... 427/409; 427/386; 427/487; 524/417; 524/422; 524/321; 525/161; 525/176; 525/519
(58) Field of Search ............................. 427/402, 407.1, 427/409, 372.2, 384, 385.5, 388.1, 388.4, 487, 508, 514, 521; 252/400.2; 524/417, 422, 321; 428/411.1; 525/161, 176, 519

(56) References Cited

U.S. PATENT DOCUMENTS

| | | | |
|---|---|---|---|
| 3,781,379 A | 12/1973 | Theodore et al. | 260/836 |
| 3,954,588 A * | 5/1976 | Hazan et al. | 205/198 |
| 3,992,478 A | 11/1976 | Kamosaki et al. | 260/857 |
| 4,091,048 A | 5/1978 | Labana et al. | 260/836 |
| 4,181,642 A | 1/1980 | Holle et al. | 260/37 |
| 4,268,542 A | 5/1981 | Sakakibara et al. | 427/195 |
| 4,355,071 A | 10/1982 | Chang | 427/386 |
| 4,489,135 A | 12/1984 | Drexler et al. | 428/423.1 |
| 4,557,856 A * | 12/1985 | Miyakawa et al. | 252/500 |
| 4,677,168 A * | 6/1987 | Hoy et al. | 525/441 |
| 4,853,146 A | 8/1989 | Röorig et al. | 252/142 |
| 4,939,213 A | 7/1990 | Jacobs, III et al. | 525/329.9 |
| 5,084,541 A | 1/1992 | Jacobs, III et al. | 528/45 |
| 5,326,596 A | 7/1994 | Kasari et al. | 204/488 |
| 5,418,301 A | 5/1995 | Hult et al. | 525/437 |
| 5,576,063 A * | 11/1996 | Briggs et al. | 427/386 |
| 5,663,247 A | 9/1997 | Sörensen et al. | 525/533 |
| 5,777,048 A * | 7/1998 | Ohrbom et al. | 525/509 |
| 5,965,213 A | 10/1999 | Sacharski et al. | 427/475 |
| 6,200,639 B1 * | 3/2001 | Duecoffre et al. | 427/386 |
| 6,258,898 B1 * | 7/2001 | Rehfuss et al. | 525/518 |
| 6,509,096 B1 * | 1/2003 | Ott et al. | 428/411.1 |

FOREIGN PATENT DOCUMENTS

| | | | |
|---|---|---|---|
| CA | 2073115 | 8/2001 | C09D/175/14 |
| DE | 24 40 740 A1 | 3/1975 | C09D/5/00 |
| DE | 22 14 650 B2 | 4/1975 | C09D/7/80 |
| DE | 27 49 576 B2 | 11/1977 | C08F/220/18 |
| DE | 196 13 547 | 11/1998 | C09D/5/46 |
| EP | 0 038 127 A1 | 3/1981 | B05D/7/26 |
| EP | 0 089 497 | 2/1983 | C09D/3/72 |
| EP | 0 249 201 | 6/1987 | C09D/3/58 |
| EP | 0 276 501 | 9/1987 | C11D/1/42 |
| EP | 0 299 420 A2 | 7/1988 | C09D/3/58 |
| EP | 0 522 420 A2 | 6/1992 | C08J/3/03 |
| EP | 0 624 577 A1 | 5/1994 | C07D/251/70 |
| EP | WO96/12754 | 5/1996 | C08G/63/20 |
| EP | WO 94/22968 | 7/1996 | C08G/18/40 |
| EP | WO97/12945 | 4/1997 | C09D/5/04 |
| GB | 133 8 204 | 11/1973 | C08G/30/00 |
| WO | WO 98/27172 A1 * | 12/1997 | C09D/133/00 |

OTHER PUBLICATIONS

Derwent Publications 0Ltd., London, GB Class A11, AN 1974–54403V, XP002901220.
English Language Abstract for DE 197 41 555.
English Language Abstract for DE 197 44 561.

* cited by examiner

Primary Examiner—Shrive P. Beck
Assistant Examiner—William Phillip Fletcher, III

(57) ABSTRACT

The present invention relates to a process for producing single-coat or multicoat clearcoat finishes on primed or unprimed substrates by applying at least one powder coating dispersion, in particular a powder clearcoat slurry, to the substrate and then curing the resulting film(s) thermally and/or with actinic radiation, in which oxalic acid is added to at least one powder coating dispersion, in particular to a powder clearcoat slurry.

13 Claims, No Drawings

LOW-YELLOWING AQUEOUS CLEAR POWDER COATING DISPERSIONS, METHOD OF MAKING THE DISPERSIONS, AND PROCESS FOR PRODUCING CLEARCOAT FINISHES WITH THE DISPERSIONS

CROSS-REFERENCE TO RELATED APPLICATIONS

The present application is a continuation of U.S. Ser. No. 09/959,067 filed on Oct. 16, 2001, now U.S. Pat. No. 6,509,096, which is a 371 of PCT/EP/00/03276 filed on Apr. 12, 2000, which claims priority to DE 199 20 141.2 filed on May 3, 1999, both of which are incorporated herein by reference.

FIELD OF THE INVENTION

The present invention relates to a process for preventing the yellowing of single-coat or multicoat paint systems produced using powder coating dispersions, especially powder clearcoat slurries.

BACKGROUND OF THE INVENTION

Powder clearcoat materials and also aqueous powder clearcoat dispersions are part of a trend for automobile coatings and, owing to their environmental compatibility, are displacing those materials which have been used to date in finishing, namely solventborne one-component clearcoat materials based on melamine resins and also the likewise solvent-based two-component clearcoat materials comprising polyacrylate resins with polyisocyanates as crosslinkers.

Aqueous powder clearcoat dispersions, also referred to by those in the art as powder clearcoat slurries, have the advantage over the powder clearcoat materials that they can be processed using conventional liquid paint technology. Furthermore, they can be applied at low film thickness and hence they contribute to the sparing use of resources. Processes of this kind are prior art. For example, the U.S. Pat. No. 4,268,542 describes a process in which a multicoat system comprising two or more coats is applied to a substrate. The surface of the substrate is first of all coated fully or partly with a powder coating material. Thereafter a powder coating dispersion, consisting of synthetic resin particles dispersed in an aqueous medium, is applied and the substrate thus treated is dried in a single step by the action of heat.

DE 196 13 547 discloses an aqueous powder clearcoat dispersion which, through the use epoxy-carboxy systems, permits crosslinking at temperatures below 160° C. However, this system exhibits a relatively strong tendency to yellow in comparison to the conventional clearcoat materials based on melamine resin or on polyisocyanate.

The German patent applications 197 41 555.5 and 197 44 561.6 describe a powder clearcoat material in which a glycidyl-containing addition polymer is crosslinked with tris(alkoxycarbonylamino)triazine and polycarboxylic acids and/or carboxy-functional poly-esters. This powder clearcoat material may likewise be formulated as an aqueous powder clearcoat material, which in relation to the prior art has advantages in respect of etchability by environmental chemicals, and also exhibits improvements in terms of yellowing. Particularly with the clearcoating of white shades, however, the yellowing resistance is still critical and requires particular care at the production stage. When selecting the raw materials and intermediates that are used for this purpose it is necessary to ensure particularly high purity and very low intrinsic yellowing, which is a disadvantage. Especially when preparing powder coating dispersions in the production plant, in batch sizes which exceed the laboratory scale, such batches may occasionally be found to be particularly critical in terms of yellowing, following application to a white undercoat.

It was therefore an object of the present invention to provide a process for producing single-coat or multicoat paint systems using powder clearcoat slurries that no longer has the disadvantages of the prior art but instead provides paint systems which in particular no longer show any yellowing, without detracting from the other, positive qualities of these paint systems.

BRIEF SUMMARY OF THE INVENTION

What has been found, accordingly, is a process for producing single-coat or multicoat clearcoat finishes on primed or unprimed substrates by applying at least one powder coating dispersion, in particular a powder clearcoat slurry, to the substrate and then curing the resulting film(s) thermally and/or with actinic radiation, in which at least one polyvalent inorganic acid and/or oxalic acid are or is added to at least one powder coating dispersion, in particular to a powder clearcoat slurry.

DETAILED DESCRIPTION OF THE INVENTION

In the text below, the novel process is referred to as the process of the invention.

The present invention additionally relates to powder clearcoat slurries to which at least one polyvalent acid and/or oxalic acid have or has been added and also to the single-coat or multicoat clearcoat finishes, and coated articles, produced by applying these powder coating dispersions, particularly powder clearcoat slurries.

In one variant of the process of the invention, the polyvalent acids and/or the oxalic acid are also added to the aqueous basecoat dispersion, leading to a further suppression of yellowing.

The novel powder coating dispersions or powder clearcoat slurries are referred to below as powder clearcoat slurries of the invention and the novel single-coat or multicoat powder clearcoat finishes are referred to as coatings of the invention.

In the light of the prior art it was surprising, and unforeseeable for the skilled worker, that as a result of the process of the invention the powder clearcoat slurries of the invention and the coatings of the invention would no longer have the disadvantages of the prior art, while suffering no impairment of their other, positive qualities.

Furthermore, it is an advantage of the present invention that the absence of color-falsifying yellow hues in the coating of the invention results in better reproducibility of the shade of the color-imparting coat.

The essential constituent of the powder clearcoat slurry of the invention is at least one polyvalent inorganic acid and/or oxalic acid.

As polyvalent acids it is possible to use, with preference, phosphoric acid and its derivatives, sulfuric acid and its derivatives, and boric acid, with particular preference phosphoric acid and its derivatives, with very particular preference phosphoric acid. Instead of or in addition to these acids it is possible to use oxalic acid.

In the context of the process of the invention, the acids are added to the powder clearcoat slurries of the invention in effective amounts. By "effective amounts" here are meant amounts which on the one hand reliably prevent yellowing without destabilizing the powder clearcoat slurry and/or harming the performance application profile of the paint systems. The skilled worker is therefore able to determine the appropriate amounts by means of simple preliminary tests.

Of particular advantage are amounts from 0.1 to 2 000 ppm, preferably from 1 to 1 500 ppm, with particular preference from 100 to 1 200 ppm, and in particular from 800 to 1 100 ppm, based in each case on the overall amount of the powder clearcoat slurry of the invention. They are therefore employed with preference.

In accordance with the invention, the acids are added to the starting products or to the intermediates at any step in the process of preparing the powder clearcoat slurry of the invention, or to the finished powder clearcoat slurry of the invention, the last-mentioned variant being of advantage and therefore being employed with preference.

To produce the coatings of the invention, the powder clearcoat slurry of the invention is applied in accordance with the process of the invention to the primed or unprimed substrate to be coated. Viewed in terms of its method, the application has no special features, but instead takes place with the aid of the customary and known methods such as spraying, knife coating, brushing, dipping, flow coating or rolling, but especially spraying. The process of the invention starts from the substrate to be coated. The substrate may be of metal, wood, plastic, glass, ceramic or paper or may comprise these materials in the form of composites. Preferably, the substrates in question comprise automobile body parts or industrial components, including containers, made of metal, or furniture.

The substrate may have been provided with a primer. In the case of plastics, the primer in question is what is known as a hydroprimer, which is cured prior to the application of the coating material of the invention, particularly of the aqueous basecoat material or of the clearcoat material. In the case of metals, especially automobile body parts, the primer comprises customary and known, cured electrocoats to which a primer-surfacer is applied and baked.

Accordingly, the powder clearcoat slurry of the invention and the process of the invention is also suitable for applications outside of automotive finishing, particularly for the coating of furniture and for industrial coating, including coil coating and container coating. The powder clearcoat slurry of the invention is especially suitable as a coating over basecoats, preferably in the automobile industry. It is particularly suitable as a single-coat or multicoat clearcoat finish over aqueous basecoats based on polyesters, polyurethane resins, and amino resins, as are described in the patents EP-B-0 089 497 or EP-A-0 522 420.

Advantageously, the powder clearcoat slurry of the invention and the process of the invention will be effected as part of the wet-on-wet technique employed in connection with the OEM finishing of automobiles, which is a further advantage of the powder clearcoat slurry of the invention.

Application by the wet-on-wet technique embraces the following worksteps:

(I) applying a basecoat film, particularly an aqueous basecoat film, to a primed or unprimed substrate,
(II) flashing off the resulting basecoat film and subjecting it to interim drying,
(III) applying a clearcoat film to the basecoat film, particularly aqueous basecoat film, and
(IV) curing the two wet films thermally and also, where appropriate, with actinic light.

The powder clearcoat slurry of the invention used in the process of the invention is curable thermally and/or with actinic radiation.

In the context of the present invention, the term "thermal curing" denotes the heat-initiated curing of a film of a coating material, for which normally a separate crosslinking agent is employed. This is customarily referred to by those in the art as external crosslinking. Where the crosslinking agents are already incorporated in the binders, the term self-crosslinking is also used. In accordance with the invention, external crosslinking is of advantage and is therefore employed with preference.

In the context of the present invention, actinic radiation means electron beams or, preferably, UV radiation. Curing by UV radiation is normally initiated by free-radical or cationic photoinitiators.

Where thermal curing and curing with actinic light are employed together for one coating material, the term "dual cure" is also used. For the cure it is possible to employ the customary and known methods such as heating in a forced air oven or with IR lamps and also, where appropriate, irradiation with UV lamps.

The powder clearcoat slurry of the invention may have the composition described in the patents DE 196 13 547, DE 197 41 555.5 and DE 197 44 561.1, except that in addition it comprises the acids for use in accordance with the invention.

Particularly advantageous powder clearcoat slurries of the invention comprise:

a) at least one epoxide-containing binder containing, based on the binder, from 0.5 to 40% by weight of copolymerized glycidyl-containing monomers, and
b) at least one tris(alkoxycarbonylamino)triazine and at least one polycarboxylic acid, in particular a straight-chain dicarboxylic acid and/or a carboxy-functional polyester as crosslinking agent or alternatively a) at least one tris(alkoxycarbonylamino)triazine and at least one oligomeric or polymeric, epoxide-containing crosslinking agent containing, based on the crosslinking agent, from 0.5 to 40% by weight of copolymerized glycidyl-containing monomers, and/or a low molecular mass, epoxide-containing crosslinking agent, and b) at least one carboxyl-containing polymer as binder and for both variants c) at least one of the above-described polyvalent inorganic acids or oxalic acid, and
d) where appropriate, at least one polyol, and/or e) where appropriate, constituents which permit curing with actinic light.

The composition of the powder slurry of the invention may vary widely and may be tailored to the particular end use. In accordance with the invention it is of advantage if the powder clearcoat slurry of the invention, based on the respective solids, comprises the constituents a), b) and c) and also, where appropriate, d) and/or e) in the following amounts:

a) from 40 to 85, preferably from 50 to 80, with particular preference from 55 to 75% by weight,
b) from 10 to 30, preferably from 12 to 25, with particular preference from 15 to 23% by weight,
c) from 0.1 to 2 000 ppm, preferably from 1 to 1 500, with particular preference from 100 to 1 200, in particular from 800 to 1 100 ppm, and also
d) from 0 to 30% by weight, and
e) from 0 to 40% by weight.

Suitable epoxy-functional binders a) for the powder clearcoat slurries of the invention are, for example, polyacrylate resins containing epoxide groups, which are preparable by copolymerizing at least one ethylenically unsaturated monomer containing at least one epoxide group in the molecule with at least one further ethylenically unsaturated monomer that contains no epoxide group in the molecule, at least one of the monomers being an ester of acrylic acid or methacrylic acid. Polyacrylate resins of this kind containing epoxide groups are known, for example, from the patents EP-A-0 299 420, DE-B-22 14 650, DE-B-27 49 576, U.S. Pat. No. 4,091,048 or U.S. Pat. No. 3,781,379.

Examples of suitable monomers which contain no epoxide group in the molecule are alkyl esters of acrylic and methacrylic acid, especially methyl acrylate, methyl methacrylate, ethyl acrylate, ethyl methacrylate, n-butyl acrylate, n-butyl methacrylate, secondary-butyl acrylate, secondary-butyl methacrylate, tert-butyl acrylate, tert-butyl methacrylate, neopentyl acrylate, neopentyl methacrylate, 2-ethylhexyl acrylate or 2-ethylhexyl methacrylate; amides of acrylic acid and methacrylic acid, especially acrylamide and methacrylamide; vinylaromatic compounds, especially styrene, methylstyrene or vinyltoluene; the nitriles of acrylic acid and methacrylic acid; vinyl and vinylidene halides, especially vinyl chloride or vinylidene fluoride; vinyl esters, especially vinyl acetate and vinyl propionate; vinyl ethers, especially n-butyl vinyl ether; or hydroxyl-containing monomers, especially hydroxyethyl acrylate, hydroxyethyl methacrylate, hydroxypropyl acrylate, hydroxypropyl methacrylate, 4-hydroxybutyl acrylate or 4-hydroxybutyl methacrylate.

Examples of suitable epoxy-functional monomers are glycidyl acrylate, glycidyl methacrylate or allyl glycidyl ether.

The polyacrylate resin containing epoxide groups normally has an epoxide equivalent weight of from 400 to 2 500, preferably from 420 to 700, a number-average molecular weight Mn (determined by gel permeation chromatography using a polystyrene standard) of from 2 000 to 20 000, preferably from 3 000 to 10 000, and a glass transition temperature Tg of from 30 to 80, preferably from 40 to 70, with particular preference from 40 to 60, and in particular from 48 to 52° C. (measured with the aid of differential scanning calorimetry (DSC)).

The preparation of the polyacrylate resin containing epoxide groups has no special features but instead takes place in accordance with the customary and known polymerization methods.

A further essential constituent of the powder clearcoat slurry of the invention is the crosslinking agent b).

Advantageously, at least two different crosslinking agents $b_1$) or $b_2$) are employed.

Of these, the first crosslinking agent, $b_1$), comprises tris(alkoxycarbonylamino)triazines and their derivatives.

Examples of suitable tris(alkoxycarbonylamino)triazines are described in the patents U.S. Pat. No. 4,939,213, U.S. Pat. No. 5,084,541 or EP-A-0 624 577. In particular, the tris (methoxy-, tris(butoxy- and/or tris(2-ethylhexoxycarbonylamino)triazines are used.

Preference is given to the methyl butyl mixed esters, the butyl 2-ethylhexyl mixed esters, and the butyl esters. They have the advantage over the straight methyl ester of better solubility in polymer melts.

The tris(alkoxycarbonylamino)triazines and their derivatives may also be used in a mixture with conventional crosslinking agents. Particularly suitable for this purpose are polyisocyanates which are different from the tris (alkoxycarbonylamino)triazines. It is also possible to use amino resins, examples being melamine resins. In this context it is possible to use any amino resin suitable for transparent topcoats or clearcoats, or a mixture of such amino resins.

Resins of this kind are well known to the skilled worker and are offered by numerous companies as commercial products.

In the case of the second crosslinking agent, $b_2$), the compounds in question comprise carboxylic acids, particularly saturated, straight-chain, aliphatic dicarboxylic acids having from 3 to 20 carbon atoms in the molecule. Instead of or in addition to them it is also possible to use carboxy-functional polyesters. With very particular preference, decane-1,10-dicarboxylic acid (dodecanedioic acid) is used. In order to modify the properties of the powder clearcoat slurries of the invention, it is possible as well to use other carboxyl-containing crosslinking agents, in minor amounts. Examples of suitable additional crosslinking agents of this kind are saturated branched or unsaturated straight-chain di- and polycarboxylic acids and also the carboxyl-functional polymers that are described in detail below as binders b).

In a second variant, the powder clearcoat slurries of the invention may comprise an epoxy-functional crosslinking agent a) and a carboxyl-containing binder b).

Examples of suitable carboxyl-containing binders b) are, for example, polyacrylate resins which are prepared by copolymerizing at least one ethylenically unsaturated monomer containing at least one acid group in the molecule with at least one further ethylenically unsaturated monomer that contains no acid groups in the molecule.

Examples of suitable oligomeric and polymeric, epoxy-functional crosslinking agents a) are the above-described binders a) containing epoxide groups.

Examples of suitable low molecular mass, epoxy-functional crosslinking agents a) are low molecular mass compounds containing at least two glycidyl groups, especially pentaerythritol tetraglycidyl ether or triglycidyl isocyanurate.

The binder a) containing epoxide groups and the carboxyl-containing crosslinking agent b) of the first inventive variant, and, respectively, the carboxyl-containing binder b) and the epoxy-functional crosslinking agent a) of the second inventive variant, are used generally in a proportion such that there are from 0.5 to 1.5, preferably from 0.75 to 1.25, equivalents of carboxyl groups per equivalent of epoxide groups. The amount of carboxyl groups present may readily be determined by titration with an alcoholic KOH solution.

The epoxy-functional binder a) or the oligomeric or polymeric epoxy-functional crosslinking agent a) contains, in copolymerized form, vinylaromatic compounds such as styrene. In order to limit the risk of cracking on weathering, however, the amount is not more than 35% by weight, based on the binder a) or on the crosslinking agent a). Preferably, from 10 to 25% by weight are copolymerized.

The powder clearcoat slurry of the invention may comprise polyols d).

Suitable polyols d) include all low molecular mass compounds, oligomers, and polymers which contain at least two, preferably at least three, primary and/or secondary hydroxyl groups and which do not destroy the solid state of the powder coating material of the invention and of the slurry of the invention.

Examples of suitable oligomers and polymers d) are linear and/or branched and/or block, comb and/or random poly (meth)acrylates, polyesters, polyurethanes, acrylated polyurethanes, acrylated polyesters, polylactones, polycarbonates, polyethers, (meth)acrylatediols, polyureas or oligomeric polyols, which function as reactive diluents for the thermal cure.

Where these oligomers and polymers are used as polyols d), they preferably contain no carboxyl groups.

Examples of suitable reactive diluents d) for the thermal cure are oligomeric polyols which are obtainable from oligomeric intermediates—themselves obtained by metathesis reactions of acyclic monoolefins and cyclic monoolefins—by hydroformylation and subsequent hydrogenation; examples of suitable cyclic monoolefins are cyclobutene, cyclopentene, cyclohexene, cyclooctene, cycloheptene, norbonene or 7-oxanorbonene; examples of suitable acyclic monoolefins are contained in hydrocarbon mixtures which are obtained in the processing of petroleum by cracking ($C_5$ cut); examples of suitable oligomeric polyols for use in accordance with the invention have a hydroxyl number of from 200 to 450, a number-average molecular weight Mn of from 400 to 1 000, and a mass-average molecular weight Mw of from 600 to 1 100;

Further examples of suitable polyols d) are branched, cyclic and/or acyclic $C_9$–$C_{16}$ alkanes that are functionalized with at least two hydroxyl groups, especially diethyloctanediols.

Further examples of polyols d) for use are hyperbranched compounds containing a tetrafunctional central group, derived by ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol (homopentaerythritol). These reactive diluents may be prepared in accordance with the customary and known methods of preparing hyperbranched and dendrimer compounds. Suitable synthesis methods are described, for example, in the patents WO 93/17060 or WO 96/12754 or in the book by G. R. Newkome, C. N. Moorefield and F. Vögtle, "Dendritic Molecules, Concepts, Syntheses, Perspectives", VCH, Weinheim, N.Y., 1996.

These polyols d) are known to the skilled worker, and many suitable compounds are available on the market.

The powder clearcoat slurry of the invention may, as component e), comprise constituents for curing with actinic radiation.

Suitable constituents e) include in principle all low molecular mass, oligomeric, and polymeric compounds that are curable with actinic light and/or electron beams, and as are commonly used in the field of UV-curable or electron beam-curable coating compositions. These radiation-curable coating compositions normally include at least one, preferably two or more, radiation-curable binders, based in particular on ethylenically unsaturated prepolymers and/or ethylenically unsaturated oligomers, where appropriate one or more reactive diluents, and where appropriate one or more photoinitiators.

It is advantageous to use the radiation-curable binders as constituents e). Examples of suitable radiation-curable binders e) are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders e) which are free from aromatic structural units. Preference is therefore given to using urethane (meth)acrylates and/or polyester (meth)acrylates, with particular preference aliphatic urethane acrylates.

Further examples of suitable constituents e) are radiation-curable reactive diluents such as low molecular mass polyfunctional ethylenically unsaturated compounds. Examples of suitable compounds of this kind are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

Examples of suitable photoinitiators e) are photoinitiators of the Norrish II type, whose mechanism of action is based on an intramolecular variant of the hydrogen abstraction reactions such as occur diversely in photochemical reactions, or cationic photoinitiators. By way of example, reference may be made here to Römpp Chemie Lexicon, 9th expanded and revised edition, Georg Thieme Verlag Stuttgart, vol. 4, 1991, or Römpp Lexikon Lacke und Druckfarben, Georg Thieme Verlag Stuttgart, New York, 1998, pages 444 to 446.

If the powder clearcoat slurry of the invention is curable only with actinic radiation, it preferably contains only these constituents e).

The powder clearcoat slurry of the invention may further comprise effective amounts of customary and known coatings additives f), such as are commonly used in clearcoat materials. Examples of suitable coatings additives f) are UV absorbers;
free-radical scavengers;
crosslinking catalysts
slip additives;
polymerization inhibitors;
defoamers;
emulsifiers, especially nonionic emulsifiers such as alkoxylated alkanols and polyols, phenols and alkyl phenols or anionic emulsifiers such as alkali metal salts or ammonium salts of alkanecarboxylic acids, alkanesulfonic acids, and sulfo acids of alkoxylated alkanols and polyols, phenols, and alkylphenols;
wetting agents such as siloxanes, fluorine compounds, carboxylic monoesters, phosphoric esters, polyacrylic acids and their copolymers, or polyurethanes;
adhesion promoters;
leveling agents;
film-forming auxiliaries such as cellulose derivatives;
flame retardants; or
rheologic control additives, such as those known from the patents WO 94/22968, EP-A-0 276 501, EP-A-0 249 201 or WO 97/12945; crosslinked polymeric microparticles, such as are disclosed, for example, in EP-A-0 008 127; inorganic phyllosilicates, such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly(meth)acrylamide, poly(meth)

acrylic acid, polyvinylpyrrolidone, styrene-maleic anhydride copolymers or ethylene-maleic anhydride copolymers and their derivatives, or hydrophobically modified ethoxylated urethanes or polyacrylates; or Further examples of suitable coatings additives are described in the textbook "Lackadditive" [Additives for coatings] by Johan Bieleman, Wiley-VCH, Weinheim, N.Y., 1998.

EXAMPLES AND COMPARATIVE EXPERIMENT

Example 1

Preparation of the Acrylate Resin 21.1 parts of xylene were introduced into a vessel and heated to 130° C. Metered into this initial charge within 4 hours at 130° C., from two separate feed vessels, were the initiator, consisting of 4.5 parts of TBPEH (tert-butyl perethylhexanoate) and 4.86 parts of xylene, and the monomer mixture, consisting of 10.78 parts of methyl methacrylate, 25.5 parts of n-butyl methacrylate, 17.39 parts of styrene and 23.95 parts of glycidyl methacrylate. The mixture was then heated to 180° C. and the solvent was stripped off in vacuo at <100 mbar.

Example 2

Powder Coating Material for Subsequent Use in the Powder Clearcoat Slurry 73.5 parts of acrylate resin as per example 1, 17.8 parts of dodecanedicarboxylic acid, 0.5 parts of tris (alkoxylcarbonylamino)triazine, 2 parts of Tinuvin 1130 (UV absorber), 0.9 parts of Tinuvin 144 (HALS) and 0.4 parts of Additol XL 490 (leveling agent) were intimately mixed in a Henschel fluid mixer, extruded on a BUSS PLK 46 extruder, ground on a Hosokawa ACM 2 mill, and screened via a 125 µm sieve.
Comparative Experiment CI: Preparation of a Powder Clearcoat Slurry 0.6 parts of Troykyd D777 (defoamer), 0.6 parts of Orotan 731 K (dispersing aid), 0.06 parts of Surfynol TMN 6 (wetting agent) and 16.5 parts of RM8 (Rohm & Haas, nonionic associative thickener based on polyurethane) were dispersed in 400 parts of deionized water. Then, in small portions, 94 parts of powder coating material from example 2 were stirred in. Subsequently, a further 0.6 parts of Troykyd D777, 0.6 parts of Orotan 731 K, 0.06 parts of Surfynol TMN 6 and 16.5 parts of RM8 were dispersed in. Finally, in small portions, 94 parts of the powder clearcoat were stirred in. The material was ground in a sand mill for 3.5 hours. The average particle size measured at the end is 4 µm. The material was filtered through a 50 µm filter, and finally 0.05% of Byk 345 (leveling agent) were added.

Example 3

Preparation of the Inventive Powder Clearcoat Slurry of the Invention Using Phosphoric Acid 1 000 ppm of phosphoric acid as a 10% strength aqueous solution were added to the powder clearcoat slurry from comparative experiment C1.

Example 4

Comparative Experiment C2 Application of the Powder Clearcoat Slurries

The powder clearcoat slurries as per example 3 (example 4) and of the comparative experiment C1 (comparative experiment C2) were applied using a cup-type gun to steel panels coated with commercially customary electrocoat material and white-pigmented aqueous basecoat material. The metal panel was flashed off at room temperature for 5 minutes and at 60° C. for 5 minutes. It was subsequently baked at a temperature of 145° C. for 30 minutes.

Example 5

Application of a Comparison Coating Material for Testing the Yellowing

As a comparison standard for the subsequent yellowing investigation, instead of the powder clearcoat slurries, a commercially customary two-component clearcoat material ("2K"; FF95-0111, from BASF Coatings AG) was applied by means of an electrostatic spray gun to a steel panel identically coated beforehand in accordance with example 4. This panel was subsequently baked at a temperature of 140° C. for 30 minutes.

Example 6

Testing the Yellowing of Powder Clearcoat Slurries

From the samples prepared in accordance with example 4, as per example 4 and comparative experiment C2, and from the comparison coating material applied in accordance with example 5, the yellow value (YV) was determined in accordance with DIN 6127. The difference between the yellow value of the samples according to example 4 and comparative experiment C2 ($Y_{sample}$) and the yellow value of the comparison standard (2K; from example 5; $YV_{2K}$) was referred to subsequently as the yellow value difference ("delta-YV") (delta-YV=$YV_{sample}$-$YV_{2K}$). The higher this value, the greater the yellowing and the difference from the 2K clearcoat material, which from experience exhibits very little yellowing.

TABLE 1

Delta-YV of the powder clearcoat slurries in accordance with example 4 and comparative experiment C2 in comparison to the 2K coating material

| Sample | delta-YV |
|---|---|
| Comparative experiment C2 | 13.4 |
| Example 4 | 1.9 |

As can be seen from table 1, the originally very high delta-YV of 13.4 falls to 1.9 as a result of the effect of the phosphoric acid.

Example 7

Effect of the Addition of Phosphoric Acid to the Aqueous Base Coat Materials 1 and 2

Example 4 was repeated except that in one case 10 ppm of phosphoric acid (example 7-1) and in one case 20 ppm of phosphoric acid (example 7-2), in each case in the form of a 10% strength aqueous solution, were added to the aqueous basecoat material. This resulted in a further, albeit slight, lowering of the yellow value.

What is claimed is:
1. A powder coating dispersion comprising a binder, a crosslinking agent, oxalic acid, and, optionally, a polyvalent inorganic acid, wherein at least one of:
   I) a) the binder comprises at least one epoxide-containing binder containing, based on the binder, from 0.5 to 40% by weight of at least one copolymerized glycidyl-containing monomer, and b) the crosslinking agent comprises at least one tris (alkoxycarbonylamino)triazine and at least one polycarboxylic acid; and/or II) a) the crosslinking agent comprises at least one tris (alkoxycarbonylamino) triazine and at least one epoxide-containing crosslinking agent containing, based on the crosslinking agent, from 0.5 to 40% by weight of at least one copolymerized glycidyl-containing monomer, wherein the epoxide-containing crosslinking agent is at least one of oligomeric and polymeric, and b) the binder comprises at least one carboxyl-containing polymer.

2. The powder coating dispersion of claim 1, wherein the oxalic acid and the polyvalent inorganic acid are present in the powder coating dispersion.

3. The powder coating dispersion of claim 1, wherein the polyvalent inorganic acid is present in the powder coating dispersion in an amount from 0.1 to 2,000 ppm per entire weight of the powder coating dispersion.

4. The powder coating dispersion of claim 1, wherein the polyvalent acid is selected from the group consisting of phosphoric acid, derivatives of phosphoric acid, sulfuric acid, derivatives of sulfuric acid, boric acid, and mixtures thereof.

5. The powder coating dispersion of claim 1, wherein the polyvalent inorganic acid comprises phosphoric acid.

6. A process for producing single-coat or multi-coat clearcoat finishes on a primed or an unprimed substrate comprising applying at least one powder coating dispersion of claim 1 to the substrate to form at least one film, and then curing the at least one film by at least one of thermally and/or with actinic radiation.

7. The process of claim 6, wherein the primed substrate is coated with at least one basecoat film.

8. The process of claim 7, wherein the at least one basecoat film includes at least one of a polyvalent inorganic acid and/or oxalic acid.

9. A method comprising:

a. adding oxalic acid and, optionally, a polyvalent inorganic acid to a powder coating dispersion comprising a binder and a crosslinking agent; and b. mixing the powder coating dispersion, wherein at least one of:

I) a) the binder comprises at least one epoxide-containing binder containing, based on the binder, from 0.5 to 40% by weight of at least one copolymerized glycidyl-containing monomer, and b) the crosslinking agent comprises at least one tris (alkoxycarbonylamino)triazine and at least one polycarboxylic acid; and/or II) a) the crosslinking agent comprises at least one tris (alkoxycarbonylamino)triazine and at least one epoxide-containing crosslinking agent containing, based on the crosslinking agent, from 0.5 to 40% by weight of at least one copolymerized glycidyl-containing monomer, wherein the epoxide-containing crosslinking agent is at least one of oligomeric and polymeric, and b) the binder comprises at least one carboxyl-containing polymer.

10. The method of claim 9, wherein the oxalic acid and the polyvalent inorganic acid are added to the powder coating dispersion.

11. The method of claim 9, wherein the polyvalent inorganic acid is added to the powder coating dispersion in an amount from 0.1 to 2,000 ppm per entire weight of the powder coating dispersion.

12. The method of claim 9, wherein the polyvalent acid is selected from the group consisting of phosphoric acid, derivatives of phosphoric acid, sulfuric acid, derivatives of sulfuric acid, boric acid, and mixtures thereof.

13. The method of claim 9, wherein the polyvalent inorganic acid comprises phosphoric acid.

* * * * *